(12) United States Patent
Takimoto et al.

(10) Patent No.: US 10,435,792 B2
(45) Date of Patent: Oct. 8, 2019

(54) LAMINATE AND METHOD OF FABRICATING LAMINATE

(71) Applicant: NHK Spring Co., Ltd., Yokohama-shi (JP)

(72) Inventors: Masaru Takimoto, Kanagawa (JP); Yuichiro Yamauchi, Kanagawa (JP); Satoshi Hirano, Kanagawa (JP); Naoya Aikawa, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 360 days.

(21) Appl. No.: 15/123,021

(22) PCT Filed: Feb. 25, 2015

(86) PCT No.: PCT/JP2015/055485
§ 371 (c)(1),
(2) Date: Sep. 1, 2016

(87) PCT Pub. No.: WO2015/133351
PCT Pub. Date: Sep. 11, 2015

(65) Prior Publication Data
US 2017/0058406 A1    Mar. 2, 2017

(30) Foreign Application Priority Data
Mar. 6, 2014 (JP) .................. 2014-044190

(51) Int. Cl.
*C23C 24/04* (2006.01)
*B32B 15/01* (2006.01)

(52) U.S. Cl.
CPC .............. *C23C 24/04* (2013.01); *B32B 15/01* (2013.01)

(58) Field of Classification Search
CPC ................................ B32B 15/01; C23C 24/04
See application file for complete search history.

(56) References Cited

U.S. PATENT DOCUMENTS

| 2007/0209475 | A1 | 9/2007 | Sakaue et al. |
| 2007/0251410 | A1 | 11/2007 | Rissanen et al. |
| 2009/0155461 | A1* | 6/2009 | Jabado ............... C23C 24/04 |
| | | | 427/180 |
| 2010/0073883 | A1 | 3/2010 | Miyamato et al. |
| 2011/0031448 | A1* | 2/2011 | Ota ..................... B22F 1/0003 |
| | | | 252/512 |
| 2011/0155432 | A1 | 6/2011 | Tomonari et al. |

(Continued)

FOREIGN PATENT DOCUMENTS

| JP | 2004-169081 | * | 6/2004 |
| JP | 2004-169081 | A | 6/2004 |

OTHER PUBLICATIONS

English translation of JP 2012-233222, EPO, accessed Aug. 21, 2018.*

(Continued)

*Primary Examiner* — Humera N Sheikh
*Assistant Examiner* — Xiaobei Wang
(74) *Attorney, Agent, or Firm* — Locke Lord LLP

(57) ABSTRACT

A laminate includes: a substrate; and a metallic coating that is formed from copper powder containing 0.002% to 0.020% by weight of phosphorus and having been subjected to reduction treatment, the metallic coating being deposited on the substrate.

3 Claims, 7 Drawing Sheets

(56) References Cited

U.S. PATENT DOCUMENTS

2014/0370203 A1* 12/2014 Sailer ................... C23C 24/04
427/455

OTHER PUBLICATIONS

U.S. Army Research Laboratory, "Cold Spray Process", https://www.arl.army.mil/www/default.cfm?page=370, Oct. 13, 2010. (Year: 2010).*

Schlenk, "Copper & Copper Alloy Powders", https://www.schlenk.com/fileadmin/editorsCMS/Medien/04_Aktuell/pdf/Mediacenter/Catalogue_Copper_Alloy_Powders.pdf, Dec. 2013. (Year: 2013).*

Supplementary European Search Report dated Sep. 11, 2017, issued for the corresponding European application No. 15758220.6.

International Search Report dated May 26, 2015, issued for PCT/JP2015/055485.

* cited by examiner

LAMINATE AND METHOD OF FABRICATING LAMINATE

FIELD

The present invention relates to a laminate formed by depositing a metallic coating onto a substrate and a method of fabricating the laminate.

BACKGROUND

The cold spray method is now widely known as a method of forming a coating. The cold spray method forms a coating on a substrate by spraying powder of a metallic material in a state of being equal to or lower than the melting point or the softening point from a nozzle together with inert gas such as helium, argon, and nitrogen and having the powder impact with a substrate to be coated while keeping the powder in the solid state (see Non Patent Literatures 1 and 2). Unlike with the thermal spray method in which a powder material is melted and sprayed onto a substrate, the cold spray method forms a coating at a relatively low temperature. The cold spray method thus exerts advantageous effects in reducing influence of thermal stress and obtaining a metallic coating with no phase transformation and with controlled oxidation. Moreover, use of a metallic material for both a substrate and a coating can generate a laminate with increased adhesion strength because an impact of the powder of the metallic material with the substrate (or an earlier formed coating) causes plastic deformation between the powder and the substrate, which results in the anchoring effect, and further causes a metallic bond between the newly formed surfaces where oxide coatings have been destroyed. Examples of a metallic material used for the cold spray method include copper of high thermal conductivity, electrical conductivity, and mechanical properties.

CITATION LIST

Non Patent Literature

Non Patent Literature 1: Yoshiyasu Itoh, et al., "Thermal and electrical properties of copper coatings produced by cold spraying", materials (Journal of Society of Materials of Science, Japan), The Society of Materials Science, Japan, Vol. 59, No. 2, pp. 143-148, February 2010

Non Patent Literature 2: Mitsuru Yoshida, et al., "Properties report of sprayed coating of copper formed by cold spray", Proceedings of 94th (2011 autumn) National Symposium, Japan Thermal Spraying Society, pp. 19-20, 2011

SUMMARY

Technical Problem

A metallic coating formed by the cold spray method is subjected to thermal treatment (annealing treatment) to increase thermal conductivity, electrical conductivity, and mechanical properties; however, forming a metallic coating with excellent thermal conductivity, electrical conductivity, and mechanical properties without separately providing thermal treatment has been required to reduce the number of devices and fabricating processes.

In view of the above, it is an object of the present invention to provide a laminate with excellent thermal conductivity, electrical conductivity, and mechanical properties and a method of fabricating the laminate without separately providing thermal treatment.

Solution to Problem

To solve the above-described problem and achieve the object, a laminate according to the present invention includes: a substrate; and a metallic coating that is formed from copper powder containing 0.002% to 0.020% by weight of phosphorus and having been subjected to reduction treatment, the metallic coating being deposited on the substrate.

Moreover, a method of fabricating a laminate according to the present invention includes: accelerating copper powder containing 0.002% to 0.020% by weight of phosphorus and having been subjected to reduction treatment together with gas heated to a temperature lower than a melting point of the copper powder; spraying the copper powder onto a surface of a substrate while keeping the copper powder in a solid state; and depositing the copper powder on the substrate to form a metallic coating.

Moreover, in the above-described method of fabricating a laminate according to the present invention, the copper powder is accelerated with gas heated to a temperature of 600 degrees or higher.

Moreover, in the above-described method of fabricating a laminate according to the present invention, the copper powder has an average grain size of 20 μm to 50 μm.

Advantageous Effects of Invention

The present invention exerts advantageous effects in obtaining a laminate with excellent thermal conductivity, electrical conductivity, and mechanical properties even without separately providing thermal treatment.

DESCRIPTION OF EMBODIMENTS

Figure 1:
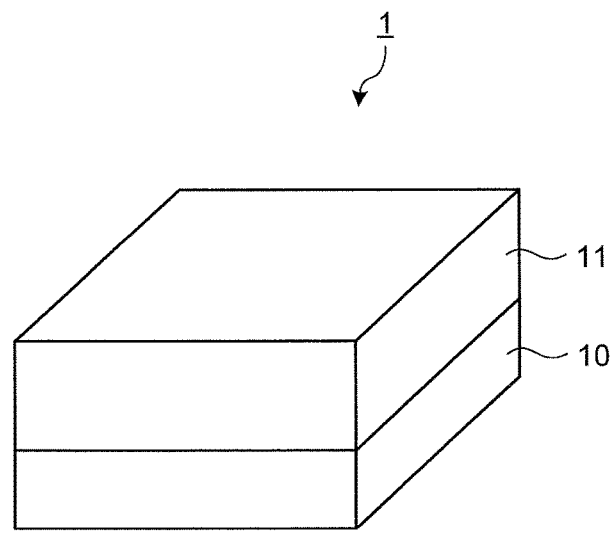
FIG. 1 is a schematic perspective view that illustrates a configuration of a laminate according to an embodiment of the present invention.

Embodiments of the present invention will now be described in detail with reference to the drawings. It should be noted that the embodiments are not intended to limit the present invention. The drawings referred to in the following description schematically illustrate the shapes, the sizes, and the positional relations to the necessary extent to understand the spirit of the present invention. The present invention is therefore not limited to the shapes, the sizes, and the positional relations illustrated in the drawings as examples.

A laminate of an embodiment of the present invention will now be described in detail with reference to the drawings. FIG. 1 is a schematic perspective view that illustrates the configuration of the laminate in the embodiment of the present invention. When a laminate 1 illustrated in FIG. 1 is used in such a case that needs a large amount of electricity, for example, vehicles and power supplies for energy storage, the laminate 1 is used as a conductive member referred to as a bus bar.

The laminate 1 includes a substrate 10 composed of metal or alloy metal and a metallic coating 11 formed on the surface of the substrate 10, laminated by the later-described cold spray method, and composed of a metallic material containing copper as a major constituent. The laminate 1 is not limited to a rectangular flat shape as illustrated in FIG. 1 and may be in the shape of a cylinder, a polygonal cylinder, or the like. The substrate 10 may be made from any materials composed of metal or alloy metal. For example, the substrate 10 is formed from aluminum or alloy metal containing aluminum.

Generally, in forming a coating by the cold spray method, a softener substrate can enhance adhesion between the substrate and the coating because of the anchoring effect. In this embodiment, the substrate 10 is made from aluminum or alloyed aluminum, and the metallic coating 11 is formed from powder composed of metal containing copper as a major constituent. This structure allows the laminate 1 to have enhanced adhesion between the substrate and the coating.

The metallic coating 11 is formed from copper powder having copper as a major constituent and containing a predetermined percent by weight of phosphorus. The copper powder has an average grain size of 20 μm to 50 μm and is fabricated by, for example, the water atomizing method. The copper powder has been subjected to reduction treatment.

More specifically, the copper powder contains 0.002% to 0.020% by weight of phosphorus in powder. The copper powder contains 0.002% to 0.020% by weight of phosphorus, thereby reducing hardness of the powder and forming a densified metallic coating 11. Furthermore, with the copper powder containing 0.002% to 0.020% by weight of phosphorus, the heat generated in forming the coating by the cold spray method causes recrystallization. This process reduces displacement, and the reduction in displacement improves the electrical conductivity and increases ductility. Consequently, the metallic coating 11 with excellent thermal conductivity, electrical conductivity and mechanical properties (ductility) can be obtained.

An increase in the amount of phosphorus to larger than 0.020% by weight increases the amount of phosphorus contained in the metal coating, which increases electrical resistance and reduces the electrical conductivity of the metal coating. An increase in the amount of phosphorus to larger than 0.020% by weight increases the temperature at which recrystallization is caused, and the heat generated in forming the coating is less likely to cause a reduction in dislocation.

The copper powder preferably contains 0.005% to 0.010% by weight of phosphorus so that the formed metallic coating 11 has high electrical conductivity and high ductility. Keeping the amount of phosphorus between 0.005% and 0.010% by weight reduces dislocation, which improves the electrical conductivity and markedly increases ductility. With this structure, the metallic coating 11 with excellent thermal conductivity, electrical conductivity and mechanical properties (ductility) can be obtained.

A method of fabricating the laminate 1 according to the present invention will now be described. The laminate 1 is fabricated in such a manner that accelerates copper powder containing a predetermined percent by weight of phosphorus together with gas heated to a temperature lower than the melting point of the copper powder toward the surface of the substrate 10, sprays the copper powder in the solid state onto the substrate 10 to be deposited thereon, and forms the metallic coating 11.

Figure 2:
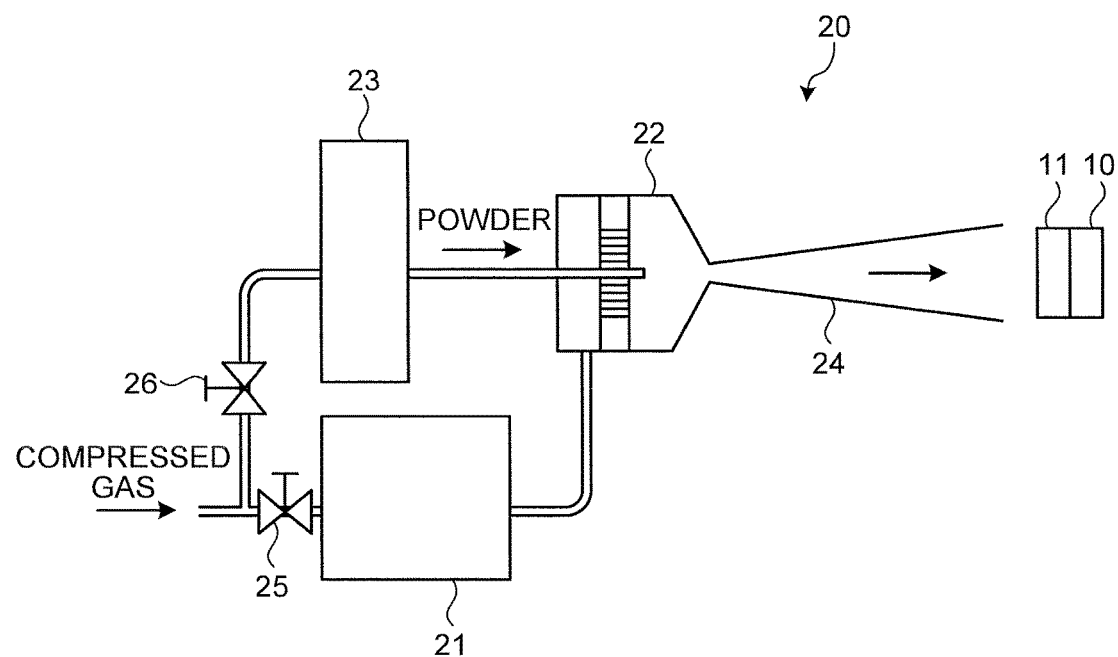
FIG. 2 is a schematic view that illustrates an overview of a cold spray device used for forming a metallic coating of the laminate according to the embodiment of the present invention.

The metallic coating 11 is formed on the substrate 10 by the cold spray method using the above-described copper powder. Formation of the metallic coating 11 will be described with reference to FIG. 2. FIG. 2 is a schematic view that illustrates an overview of a cold spray device 20 used for forming the metallic coating 11 of the laminate 1 according to the embodiment of the present invention.

The cold spray device 20 includes a gas heater 21 that heats activating gas, a powder supply device 23 that stores therein a powder material to be sprayed onto the substrate 10 and supplies the material to a spray gun 22, and a gas nozzle 24 that sprays the powder material mixed with the heated activating gas in the spray gun 22 to the substrate 10. The powder material is copper powder having a grain size (an average grain size) of about 20 μm to 50 μm and containing a range of 0.002% to 0.020% by weight of phosphorus.

As the activating gas, helium, nitrogen, air, and the like are used. Supplied activating gas is supplied to the gas heater 21 and the powder supply device 23 by valves 25 and 26, respectively. The activating gas supplied to the gas heater 21 is heated to a temperature, for example, between 600 degrees and the melting point, inclusive, of alloy used as the powder material to form the metallic coating 11 and is supplied to the spray gun 22. The temperature for heating the activating gas is preferably between 800 degrees and the melting point, inclusive, of alloy used as the powder material.

The activating gas supplied to the powder supply device 23 supplies a predetermined discharge amount of the powder material (copper powder) in the powder supply device 23 to the spray gun 22. The heated activating gas is turned to a supersonic flow (about 340 m/s or higher) by the gas nozzle 24 in the convergent-divergent shape. The gas pressure of the activating gas is preferably between 1 MPa and 5 MPa, more preferably, between 2 MPa and 4 MPa. The gas pressure of the activating gas is set between 1 MPa to 5 MPa, which can increase the adhesion strength between the substrate 10 and the metallic coating 11. The powder material supplied to the spray gun 22 is put into the ultrasonic flow of the activating gas and accelerated. The powder material impacts with the substrate 10 at a high speed while keeping the solid state and forms the metallic coating 11. The device is not limited to the cold spray device 20 in FIG. 2 as long as the device can form the metallic coating 11 by causing a powder material composed of metal containing copper as a major constituent to impact with the substrate 10 while keeping the powder material in the solid state.

When the powder material forming the metallic coating 11 is sprayed on the surface of the substrate 10 by the cold spray method, heat resulting from impact of the powder material with the substrate 10 causes recrystallization (dynamic recrystallization) on the formed metallic coating. With this process, a densified metallic coating 11 can be obtained without providing thermal treatment to the formed coating.

The metallic coating 11 preferably has electrical conductivity (IACS) of 90% or higher, more preferably, 93% or higher. IACS indicates the electrical conductivity (%) to the standard annealed copper (with the standard annealed copper representing 100%). The metallic coating 11 is formed from copper powder having excellent thermal conductivity and has good electrical conductivity. With these facts, the metallic coating 11 is considered to have good thermal conductivity.

According to the above-described embodiment, the metallic coating 11 is formed by the spray coating method using copper powder, which contains 0.002% to 0.020% by weight of phosphorus and has been subjected to reduction treatment. In this manner, a laminate having excellent thermal conductivity, electrical conductivity, and mechanical properties can be obtained even without separately providing thermal treatment.

EXAMPLES

A Laminate was fabricated by causing a copper coating containing a predetermined amount of phosphorus to be formed on an aluminum substrate (board) by the method of fabricating a laminate according to the embodiment, and evaluations of electrical conductivity and mechanical properties of the laminate were carried out.

First Example

A laminate was fabricated in such a manner that sprays copper powder (the average grain size: about 35 μm), which contains 0.002% by weight of phosphorus and has been subjected to reduction treatment, on an aluminum substrate (A1050-H24) using the cold spray device 20 under the following conditions: activating gas: nitrogen, the activating gas temperature: 600 degrees, the activating gas pressure: 3 MPa, the working distance (WD): 25 mm, the traverse speed: 200 mm/s, and the number of passes: six times, and forms a metallic coating. In this example, an about 1.1 mm metallic coating was formed in one pass, and an about 6.6 mm metallic coating was thus formed in six passes. Copper powder fabricated by the water atomizing method was used.

Second Example

A laminate was fabricated in such a manner that sprays copper powder (the average grain size: about 35 μm), which contains 0.007% by weight of phosphorus and has been subjected to reduction treatment, on an aluminum substrate (A1050-H24) using the cold spray device 20 under the same conditions as the first example for the activating gas, the activating gas temperature, the activating gas pressure, the working distance, the traverse speed, and the number of passes and forms a metallic coating.

Third Example

A laminate was fabricated in such a manner that sprays copper powder (the average grain size: about 35 μm), which contains 0.009% by weight of phosphorus and has been subjected to reduction treatment, on an aluminum substrate (A1050-H24) using the cold spray device 20 under the same conditions as the first example for the activating gas, the activating gas temperature, the activating gas pressure, the working distance, the traverse speed, and the number of passes and forms a metallic coating.

Fourth Example

A laminate was fabricated in such a manner that sprays copper powder (the average grain size: about 35 μm), which contains 0.017% by weight of phosphorus and has been subjected to reduction treatment, on an aluminum substrate (A1050-H24) using the cold spray device 20 under the same conditions as the first example for the activating gas, the activating gas temperature, the activating gas pressure, the working distance, the traverse speed, and the number of passes and forms a metallic coating.

First Comparative Example

A laminate was fabricated in such a manner that sprays copper powder (the average grain size: about 35 μm), which contains 0.021% by weight of phosphorus and has been subjected to reduction treatment, on an aluminum substrate (A1050-H24) using the cold spray device 20 under the same conditions as the example for the activating gas, the activating gas temperature, the activating gas pressure, the working distance, the traverse speed, and the number of passes and forms a metallic coating.

Second Comparative Example

A laminate was fabricated in such a manner that sprays copper powder (the average grain size: about 35 μm), which contains 0.023% by weight of phosphorus and has been subjected to reduction treatment, on an aluminum substrate (A1050-H24) using the cold spray device 20 under the same conditions as the first example for the activating gas, the activating gas temperature, the activating gas pressure, the working distance, the traverse speed, and the number of passes and forms a metallic coating.

Third Comparative Example

A laminate was fabricated in such a manner that sprays copper powder (the average grain size: about 35 μm), which contains 0.013% by weight of phosphorus and has not been subjected to reduction treatment, on an aluminum substrate (A1050-H24) using the cold spray device 20 under the same conditions as the first example for the activating gas, the activating gas temperature, the activating gas pressure, the working distance, the traverse speed, and the number of passes and forms a metallic coating.

A portion of the metallic coating was cut out from each of the laminates, which were fabricated in the above-described methods, according to the first to the fourth examples and the first to the third comparative examples as a test piece. Evaluations of electrical conductivity were carried out on the test pieces. Results of the evaluations are indicated in Table 1. IACS in Table 1 indicates the electrical conductivity (%) to the standard annealed copper (with the standard annealed copper representing 100%). Each of the test pieces was cut out in a rectangular prism of 2 mm×2 mm×40 mm in size. Potential was measured using four terminal sensing by applying measurement current (1 A) between measuring points having a distance of 23 mm therebetween.

TABLE 1

|  | Reduction treatment on powder | Phosphorus content (wt %) | Activating gas temperature (degree) | IACS (%) |
|---|---|---|---|---|
| First example | Applied | 0.002 | 600 | 93.0 |
| Second example | Applied | 0.007 | 600 | 100.0 |
| Third example | Applied | 0.009 | 600 | 99.0 |
| Fourth example | Applied | 0.017 | 600 | 93.1 |
| First comparative example | Applied | 0.021 | 600 | 85.2 |
| Second comparative example | Applied | 0.023 | 600 | 83.0 |
| Third comparative example | Not Applied | 0.013 | 600 | 83.2 |

Fifth Example

A test piece was fabricated in such a manner that sprays copper powder (the average grain size: about 35 μm), which contains 0.002% by weight of phosphorus and has been subjected to reduction treatment, on an aluminum substrate (A1050-H24) using the cold spray device 20 under the following conditions: activating gas: nitrogen, the activating gas temperature: 800 degrees, the activating gas pressure: 3 MPa, the working distance (WD): 25 mm, the traverse speed: 200 mm/s, and the number of passes: six times, and forms a metallic coating. In this example, an about 1.2 mm metallic coating was formed in one pass, and an about 7.2 mm metallic coating was thus formed in six passes.

Sixth Example

A test piece was fabricated in such a manner that sprays copper powder (the average grain size: about 35 μm), which contains 0.007% by weight of phosphorus and has been subjected to reduction treatment, on an aluminum substrate (A1050-H24) using the cold spray device 20 under the same conditions as the fifth example for the activating gas, the activating gas temperature, the activating gas pressure, the working distance, the traverse speed, and the number of passes and forms a metallic coating.

Seventh Example

A test piece was fabricated in such a manner that sprays copper powder (the average grain size: about 35 μm), which contains 0.009% by weight of phosphorus and has been subjected to reduction treatment, on an aluminum substrate (A1050-H24) using the cold spray device 20 under the same conditions as the fifth example for the activating gas, the activating gas temperature, the activating gas pressure, the working distance, the traverse speed, and the number of passes and forms a metallic coating.

Eighth Example

A test piece was fabricated in such a manner that sprays copper powder (the average grain size: about 35 μm), which contains 0.017% by weight of phosphorus and has been subjected to reduction treatment, on an aluminum substrate (A1050-H24) using the cold spray device 20 under the same conditions as the fifth example for the activating gas, the activating gas temperature, the activating gas pressure, the working distance, the traverse speed, and the number of passes and forms a metallic coating.

Fourth Comparative Example

A test piece was fabricated in such a manner that sprays copper powder (the average grain size: about 35 μm), which contains 0.023% by weight of phosphorus and has been subjected to reduction treatment, on an aluminum substrate (A1050-H24) using the cold spray device 20 under the same conditions as the fifth example for the activating gas, the activating gas temperature, the activating gas pressure, the working distance, the traverse speed, and the number of passes and forms a metallic coating.

Fifth Comparative Example

A test piece was fabricated in such a manner that sprays copper powder (the average grain size: about 35 μm), which contains 0.013% by weight of phosphorus and has not been subjected to reduction treatment, on an aluminum substrate (A1050-H24) using the cold spray device 20 under the same conditions as the fifth example for the activating gas, the activating gas temperature, the activating gas pressure, the working distance, the traverse speed, and the number of passes and forms a metallic coating.

A portion of the metallic coating was cut out from each of the laminates, which were fabricated in the above-described methods, according to the fifth to the eighth examples and the fourth and the fifth comparative examples as a test piece. Evaluations of electrical conductivity were carried out on the test pieces. Results of the evaluations are indicated in Table 2. Electrical conductivity was measured in the same manner as the above-described first to fourth examples, which is, in such a manner that measures potential using four terminal sensing by applying measurement current (1 A) between measuring points, which have a distance of 23 mm therebetween, on a test piece of 2 mm×2 mm×40 mm in size.

TABLE 2

|  | Reduction treatment on powder | Phosphorus content (wt %) | Activating gas temperature (degree) | IACS (%) |
|---|---|---|---|---|
| Fifth example | Applied | 0.002 | 800 | 99.0 |
| Sixth example | Applied | 0.007 | 800 | 100.0 |
| Seventh example | Applied | 0.009 | 800 | 100.0 |
| Eighth example | Applied | 0.017 | 800 | 100.0 |
| Fourth comparative example | Applied | 0.023 | 800 | 92.0 |
| Fifth comparative example | Not Applied | 0.013 | 800 | 92.0 |

Figure 3:
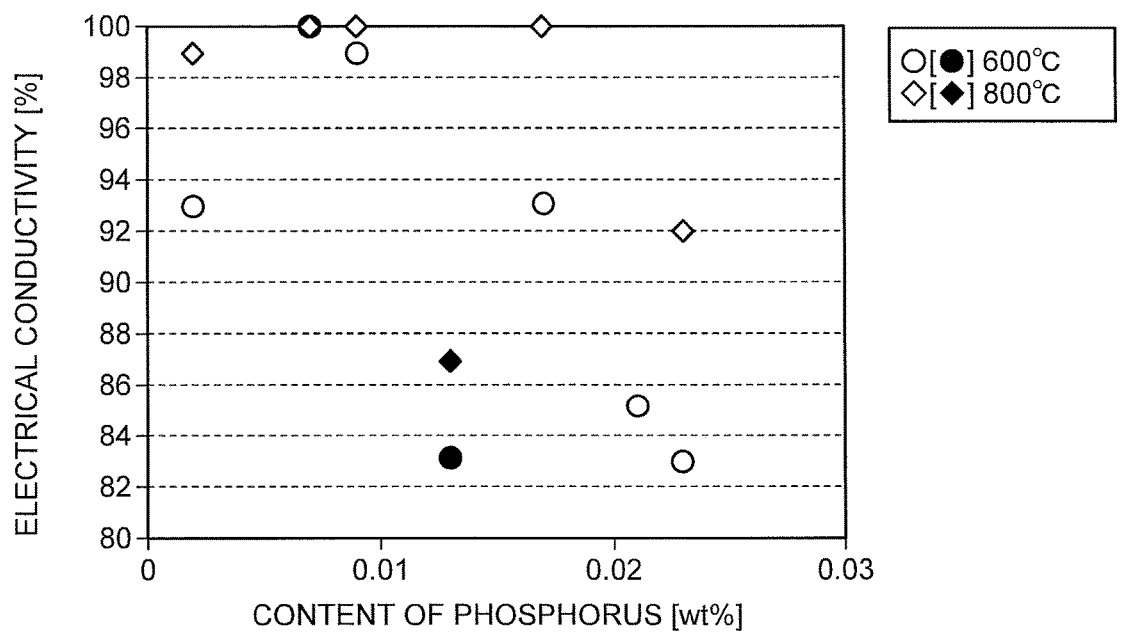
FIG. 3 is a graph that illustrates relations between the phosphorus content and the electrical conductivity on the metallic coatings according to examples of the present invention.

FIG. 3 is a graph that illustrates relations between the phosphorus content and the electrical conductivity (IACS) on the metallic coatings according to the examples. On the graph of FIG. 3, a dot indicates a result of measuring a metallic coating (the first to the fourth examples and the first to the third comparative examples) formed at an activating temperature of 600 degrees, whereas a square indicates a result of measuring a metallic coating (the fifth to the eighth examples and the fourth and the fifth comparative examples) formed at an activating temperature of 800 degrees. Furthermore, on the graph of FIG. 3, a white mark with a black outline indicates a result of measuring a metallic coating (the first to the eighth examples and the first, the second, and the fourth comparative examples) formed from copper powder having been subjected to reduction treatment, whereas a black mark indicates a result of measuring a metallic coating (the third and the fifth comparative examples) formed from copper powder having not been subjected to reduction treatment.

As illustrated in Tables 1 and 2, and FIG. 3, the electrical conductivity in the first to the eighth examples containing respective amounts of phosphorus is higher compared with the electrical conductivity in the first to the fifth comparative examples. Specifically, the second, the third, the fifth to the seventh examples each have electrical conductivity of 99.0 percent or higher, which means that a metallic coating with higher electrical conductivity can be obtained by setting the amount of phosphorus contained in the copper powder between 0.007% and 0.010% by weight. Even when using 0.017% by weight of phosphorus, a metallic coating with high electrical conductivity can be obtained by setting the activating gas temperature at 800 degrees. Consequently, a metallic coating with higher electrical conductivity can be obtained by controlling the amount of phosphorus. Metallic coatings (the third and the fifth comparative examples) formed from copper powder having not been subjected to reduction treatment each have 0.013% by weight of phosphorus; however, the electrical conductivity is lower compared with metallic coatings of the first to the eighth examples.

Figure 4:
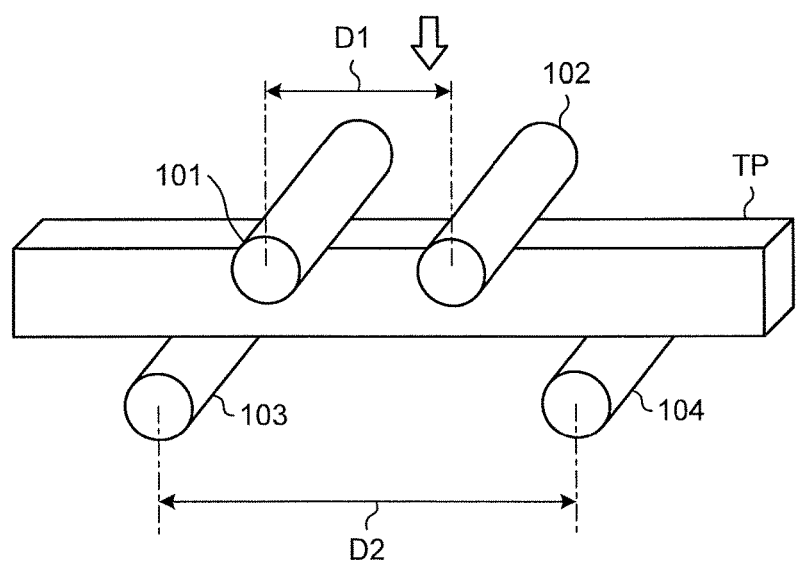
FIG. 4 is an illustrative drawing of measurement of displacement by four-point bending on the metallic coatings according to the examples of the present invention.

As a next step, measurement of displacement by four-point bending was carried out on laminates of the first to the seventh examples and the first to the fifth comparative examples. FIG. 4 is an illustrative drawing of measurement of displacement by four-point bending on the metallic coating according to the examples. The measurement of displacement by four-point bending was carried out on each test piece TP of 2 mm×2 mm×40 mm in size in such a manner that presses the test piece TP between cylindrical supports 101 and 102 and cylindrical supports 103 and 104 in a direction perpendicular to the longitudinal direction and applies a load to the test piece TP. In the measurement of displacement by four-point bending, the test piece TP was pressed between the supports in such a manner that has the test piece contact with two supports 101 and 102, which have a distance D1 of 10 mm between the respective force application points (between the respective shaft centers), from a side of the test piece and further has the test piece contact with two supports 103 and 104, which have a distance D2 of 30 mm between the respective supporting points (between the respective shaft centers), from the other side of the test piece. In this example, a load was applied to the test piece TP by applying a load to the supports 101 and 102. The load speed of the load applied to the test piece was 3.0 mm/min., and the supports 101 to 104 had diameters of 2.5 mm.

Figure 5:
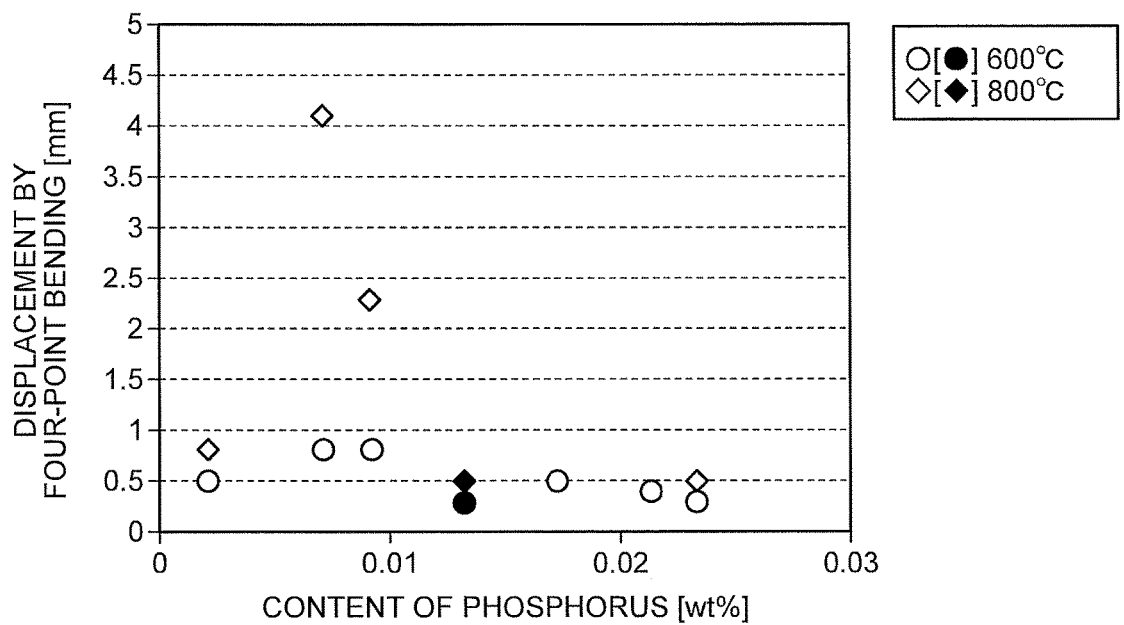
FIG. 5 is a graph that illustrates relations between the phosphorus content and displacement by four-point bending on the metallic coatings according to the examples of the present invention.

FIG. 5 is a graph that illustrates relations between the phosphorus content and displacement by four-point bending on the metallic coatings according to the examples. On the graph of FIG. 5, a dot indicates a result of measuring a metallic coating (the first to the fourth examples and the first to the third comparative examples) formed at an activating temperature of 600 degrees, whereas a square indicates a result of measuring a metallic coating (the fifth to the seventh examples and the fourth and the fifth comparative examples) formed at an activating temperature of 800 degrees. Furthermore, on the graph of FIG. 5, a white mark with a black outline indicates a result of measuring a metallic coating (the first to the seventh examples and the first, the second, and the fourth comparative examples) formed from copper powder having been subjected to reduction treatment, whereas a black mark indicates a result of measuring a metallic coating (the third and the fifth comparative examples) formed from copper powder having not been subjected to reduction treatment.

As illustrated in FIG. 5, the amounts of displacement by four-point bending on the metallic coatings of the first to the seventh examples, which contain respective amounts of phosphorus, are larger compared with the amounts of displacement by four-point bending in the first to the fifth comparative examples. Specifically, the sixth and the seventh examples have larger amounts of displacement by four-point bending, which means that a metallic coating with higher ductility can be obtained by setting the amount of phosphorus contained in the copper powder between 0.007% to 0.009% by weight. Conversely, in the second and the fourth comparative examples, dynamic recrystallization was difficult to be caused due to such a large amount of phosphorus, which resulted in brittle fracture. Consequently, a metallic coating with high ductility can be obtained by controlling the amount of phosphorus. Metallic coatings (the third and the fifth comparative examples) formed from copper powder having not been subjected to reduction treatment have 0.013% by weight of phosphorus; however, the amounts of displacement by four-point bending are smaller compared with the metallic coatings of the first to the seventh examples.

As a next step, measurement of the vickers hardness was conducted on laminates of the first to the sixth examples and the second to the fifth comparative examples. In measuring the vickers hardness, test pieces were prepared by cutting out the center portions of respective metallic coatings cut in a size of 50 mm×50 mm×6 mm. After the test pieces were buried and mirror-polished, the vickers hardness test was conducted on the test pieces. The applied load was 300 gf, and an average value between 3 and 5 pieces was calculated.

Figure 6:
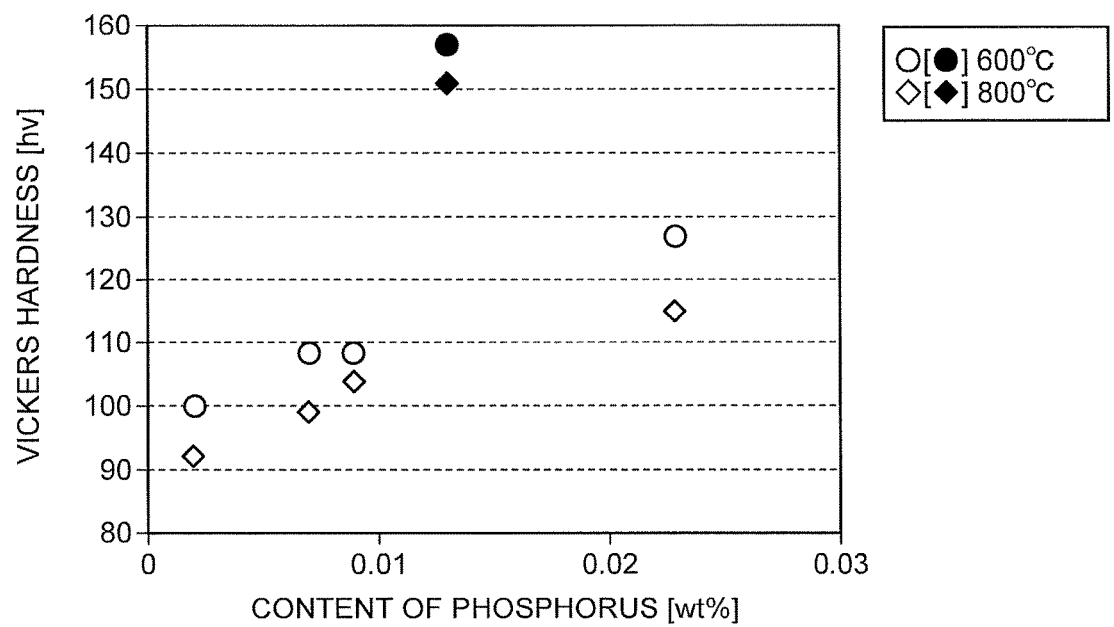
FIG. 6 is a graph that illustrates relations between the phosphorus content and the vickers hardness on the metallic coatings according to the examples of the present invention.

FIG. 6 is a graph that illustrates relations between the phosphorus content and the vickers hardness on the metallic coatings according to the examples. On the graph of FIG. 6, a dot indicates a result of measuring a metallic coating (the first to the third examples and the second and the third comparative examples) formed at an activating temperature of 600 degrees, whereas a square indicates a result of measuring a metallic coating (the sixth and the seventh examples and the fourth and the fifth comparative examples) formed at an activating temperature of 800 degrees. Furthermore, on the graph of FIG. 6, a white mark with a black outline indicates a result of measuring a metallic coating (the first to the third, the sixth, and the seventh examples and the second and the fourth comparative examples) formed from copper powder having been subjected to reduction treatment, whereas a black mark indicates a result of measuring a metallic coating (the third and the fifth comparative examples) formed from copper powder having not been subjected to reduction treatment.

In metallic coatings of the examples, the vickers hardness increases with an increase in the content of phosphorus as illustrated in FIG. 6. Specifically, the sixth and the seventh examples have larger amounts of displacement by four-point bending, which means that a metallic coating with higher ductility can be obtained by setting the content of phosphorus between 0.007% and 0.009% by weight. Consequently, a metallic coating with further higher ductility is considered to be available by controlling the amount of phosphorus, for example, between 0.005% to 0.010% by weight. Metallic coatings (the third and the fifth comparative examples) formed from copper powder having not been subjected to reduction treatment each have 0.013% by weight of phosphorus, and the vickers hardness is extremely large compared with the metallic coatings of the first to the third, the sixth, and the seventh examples.

As a next step, a crystal grain map was fabricated based on the above-described test pieces. Electron backscatter diffraction (EBSD) caused on the surface of the sample by irradiating a metallic coating with an electron beam exerts effects in obtaining information about the crystal system and the crystal orientation of the sample. Information about the crystal system and the crystal orientation distribution in a micro area was obtained by inspecting the EBSD pattern with the electron beam scanning and analyzing the EBSD pattern, and in this manner, a crystal grain map was fabricated.

Figure 7:
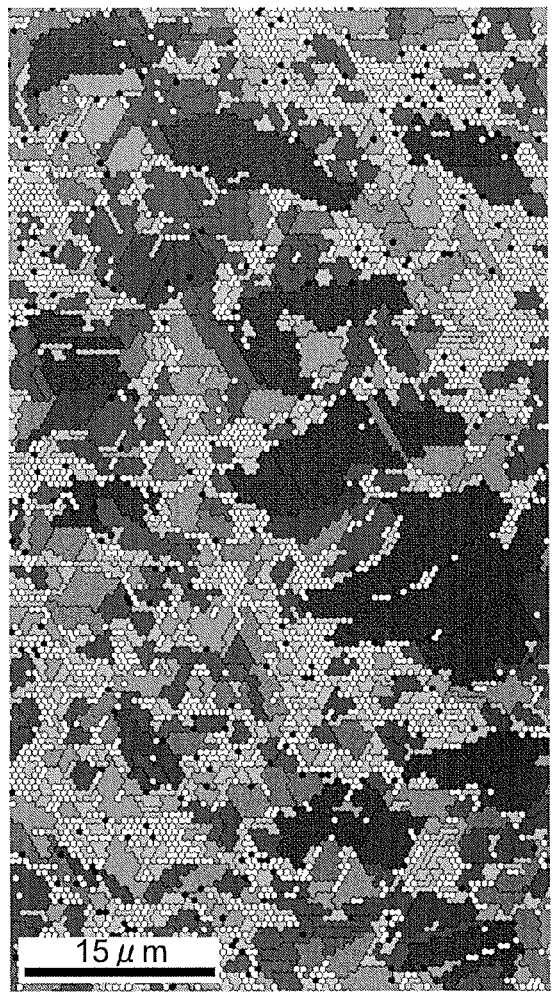
FIG. 7 is a drawing that illustrates a crystal grain map of a metallic coating containing 0.002% by weight of phosphorus according to a fifth example of the examples of the present invention.
Figure 7:
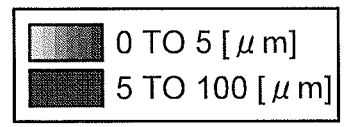
Figure 8:
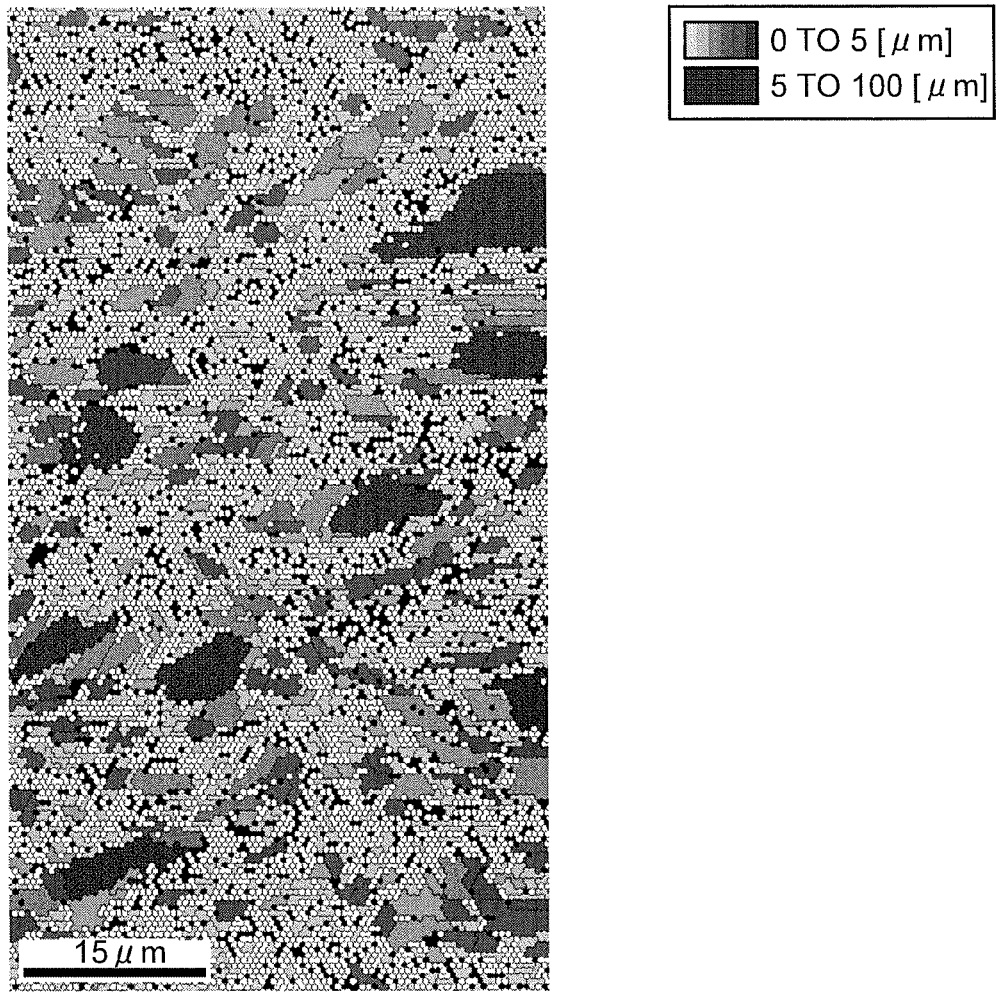
FIG. 8 is a drawing that illustrates a crystal grain map of a metallic coating containing 0.007% by weight of phosphorus according to a second example of the examples of the present invention.
Figure 9:
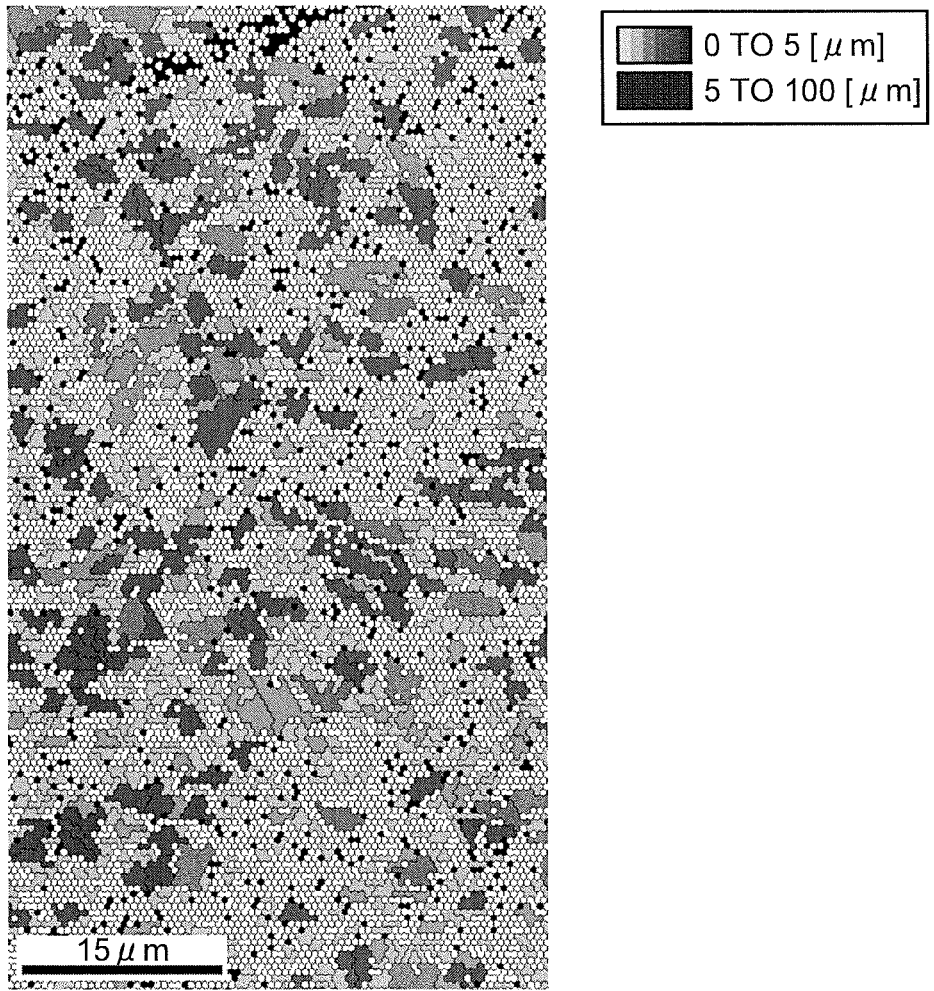
FIG. 9 is a drawing that illustrates a crystal grain map of a metallic coating containing 0.023% by weight of phosphorus according to a fourth comparative example of the examples of the present invention.
Figure 10:
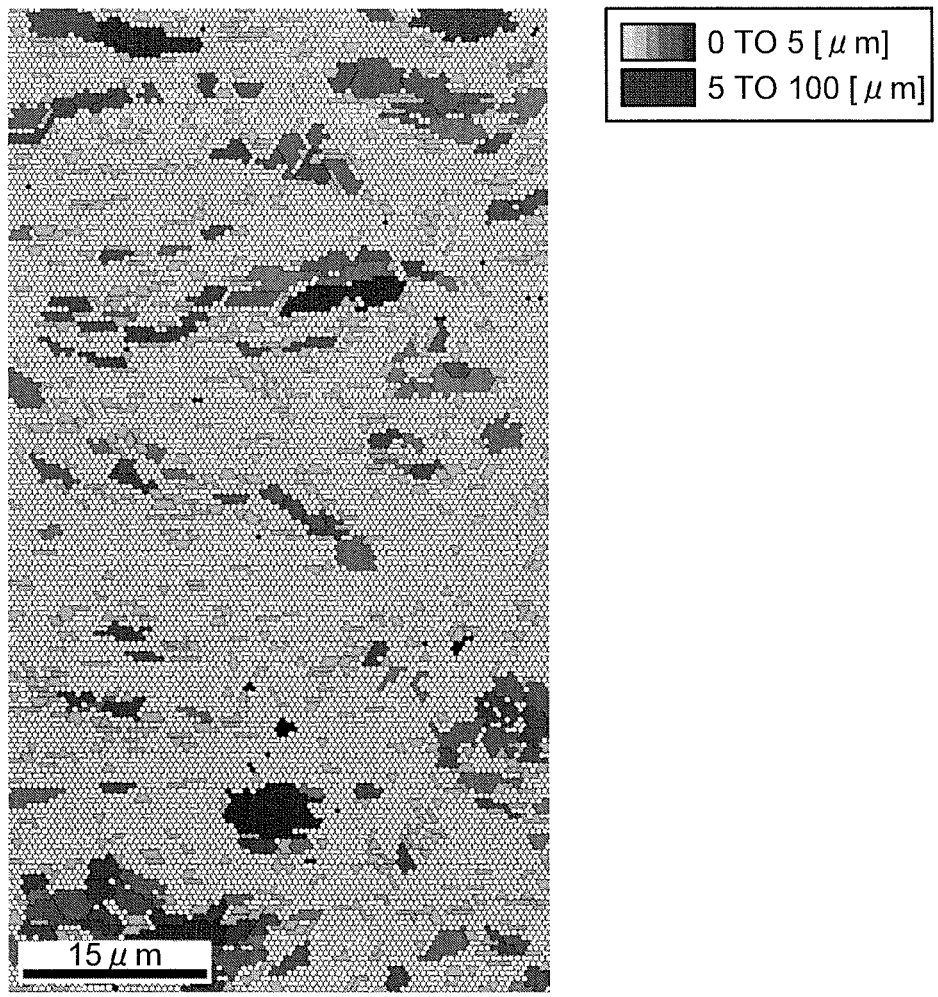
FIG. 10 is a drawing that illustrates a crystal grain map of a metallic coating containing 0.013% by weight of phosphorus and formed from copper powder having not been subjected to reduction processing according to a third comparative example of the examples of the present invention.

FIG. 7 is a drawing that illustrates a crystal grain map (the activating gas temperature: 800 degrees) of the metallic coating containing 0.002% by weight of phosphorus according to the fifth example of the examples. FIG. 8 is a drawing that illustrates a crystal grain map (the activating gas temperature: 600 degrees) of the metallic coating containing 0.007% by weight of phosphorus according to the second example of the examples. FIG. 9 is a drawing that illustrates a crystal grain map (the activating gas temperature: 800 degrees) of the metallic coating containing 0.023% by weight of phosphorus according to the fourth comparative example of the examples. FIG. 10 is a drawing that illustrates a crystal grain map (the activating gas temperature: 600 degrees) of the metallic coating containing 0.013% by weight of phosphorus and formed from copper powder having not been subjected to reduction treatment according to the third comparative example of the examples.

As illustrated in FIGS. 7 and 8, on the crystal grain maps with 0.002% (the fifth example) and 0.007% (the second example) by weight of phosphorus, large areas are occupied by 5 μm or larger grains. The average crystal grain sizes of the detected grains are large, such as 2.15 μm in the second example and 2.87 μm in the fifth example.

As illustrated in FIGS. 9 and 10, on the crystal grain maps with 0.023% (the fourth comparative example) and 0.013% (the third comparative example) by weight of phosphorus, quite small areas are occupied by 5 μm or larger grains, and most areas are with grains of an undetectable grain size. The average crystal grain sizes of the detected grains are small, such as 1.67 μm in the third comparative example and 1.50 μm in the fourth comparative example.

The crystal grain maps of FIGS. 7 to 9 indicate that recrystallization is likely to be caused by controlling the amount of phosphorus even without separately providing thermal treatment and that a metallic coating with excellent electrical conductivity and mechanical properties can be obtained in this manner. With regards to the metallic coating (the third comparative example and FIG. 10) formed from copper powder having not been subjected to reduction treatment, although the amount of phosphorus is 0.013% by weight, the average crystal grain size is small compared with those of the metallic coatings of the second and the fifth examples. In this case, recrystallization is difficult to be caused.

The above-described embodiments are only examples to implement the present invention, and the present invention is not limited to these embodiments. Various modifications can be made to the present invention according to specifications or the like, and it is obvious from the above description that other various embodiments can be implemented within the scope of the present invention.

INDUSTRIAL APPLICABILITY

As described above, a laminate and a method of fabricating the laminate according to the present invention exert advantageous effects in obtaining a laminate with excellent thermal conductivity, electrical conductivity, and mechanical properties even without separately providing thermal treatment.

REFERENCE SIGNS LIST 1 laminate
10 substrate
11 metallic coating
20 cold spray device
21 gas heater
22 spray gun
23 powder supply device
24 gas nozzle

The invention claimed is:

1. A laminate comprising:
a substrate; and
a metallic coating that is formed from copper powder consisting of 0.002% to 0.020% by weight of phosphorus and balance of copper and unavoidable impurities, the copper powder having been subjected to reduction treatment, the metallic coating being deposited on the substrate,
wherein the copper powder has an average grain size of 20 μm to 50 μm and the metallic coating has an electrical conductivity of at least 93% IACS.

2. A method of fabricating a laminate, the method comprising:
accelerating copper powder consisting of 0.002% to 0.020% by weight of phosphorus and balance of copper and unavoidable impurities and having been subjected to reduction treatment together with gas heated to a temperature lower than a melting point of the copper powder;
spraying the copper powder onto a surface of a substrate while keeping the copper powder in a solid state; and
depositing the copper powder on the substrate to form a metallic coating,
wherein the copper powder has an average grain size of 20 μm to 50 μm, and the metallic coating has an electrical conductivity of at least 93% IACS.

3. The method of fabricating a laminate according to claim 2, wherein the copper powder is accelerated with gas heated to a temperature of 600° C. or higher.

* * * * *